United States Patent [19]
Raasch

[11] Patent Number: 4,729,709
[45] Date of Patent: Mar. 8, 1988

[54] DEVICE FOR TRANSFERRING CROSSWOUND COILS FROM A CROSSWOUND COIL DELIVERY LOCATION OF A TEXTILE MACHINE INTO A BOX-SHAPED CONVEYANCE

[75] Inventor: Hans Raasch, Monchen-Gladbach, Fed. Rep. of Germany

[73] Assignee: W. Schlafhorst & Co., Monchen-Gladbach, Fed. Rep. of Germany

[21] Appl. No.: 798,630

[22] Filed: Nov. 15, 1985

[30] Foreign Application Priority Data

Nov. 15, 1984 [DE] Fed. Rep. of Germany ....... 3441778

[51] Int. Cl.⁴ ............................................. B65G 67/00
[52] U.S. Cl. ..................................... 414/399; 198/430; 242/35.5 A; 294/87.1; 414/68; 414/80; 414/626; 414/736; 414/908
[58] Field of Search ............... 414/391, 398, 399, 224, 414/226, 736, 753, 591, 618, 908, 910, 564, 911, 68, 80, 81, 763, 684, 784; 198/426, 429, 430; 901/7, 16; 242/35.5 A; 294/87.1

[56] References Cited

U.S. PATENT DOCUMENTS

| | | |
|---|---|---|
| 3,193,320 | 7/1965 | Gardner et al. ............... 294/87.1 X |
| 3,434,602 | 3/1969 | Vann, III ............... 414/784 |
| 3,627,147 | 12/1971 | Yowell et al. ............... 414/784 |
| 3,941,255 | 3/1976 | Wolf ............... 414/784 |
| 4,375,936 | 3/1983 | Dechantsreiter ............... 414/911 X |
| 4,555,215 | 11/1985 | Raasch et al. ............... 414/398 X |
| 4,558,776 | 12/1985 | Lattion ............... 414/68 X |
| 4,610,592 | 9/1986 | Pienta ............... 414/80 X |

FOREIGN PATENT DOCUMENTS

| | | | |
|---|---|---|---|
| 1093326 | 5/1955 | France ............... | 414/684 |
| 18663 | 2/1977 | Japan ............... | 414/783 |

Primary Examiner—Frank E. Werner
Assistant Examiner—Stuart J. Millman
Attorney, Agent, or Firm—Herbert L. Lerner; Laurence A. Greenberg

[57] ABSTRACT

A device for transferring crosswound coils from a crosswound-coil delivery location of a textile machine into a box-shaped conveyance includes a flat conveyor for collecting crosswound coils in mutually adjacent rows, and grippers for unloading the collected crosswound coils, the flat conveyor and the grippers being combined into one structural unit, the structural unit being pivotable in a vertical plane through an angle of substantially 180° and being controllably changeable in position in vertical and horizontal direction.

17 Claims, 4 Drawing Figures

DEVICE FOR TRANSFERRING CROSSWOUND COILS FROM A CROSSWOUND COIL DELIVERY LOCATION OF A TEXTILE MACHINE INTO A BOX-SHAPED CONVEYANCE

Specification

The invention relates to a device for transferring crosswound coils from a crosswound coil delivery location of a textile machine into a box-shaped conveyance or transport container and, more particularly, including a flat conveyor for collecting mutually lined-up crosswound coils, and grippers for unloading the collected crosswound coils.

Machines for producing crosswound coils or cheeses, such as open-ended rotary spinning machines, for example, have a conveyor belt or a roller conveyor, for example, at the crosswound-coil delivery location, the crosswound coils which are produced and wound, respectively being collected on the conveyor belt or roller conveyor. The coils can then be grasped by mechanical grippers and thrown off the conveyor. This occurs, however, without any particular care being given to the crosswound coils.

It is accordingly an object of the invention to provide a device of the aforementioned general type for transferring the crosswound coils from the crosswound-coil delivery location automatically into a box-shaped conveyance or transport container in a manner which cares for the crosswound coils, and thereby to provide a possibility of automatically inserting the crosswound coils in rows and in layers into the conveyance without having to move unnecessarily large volumes.

With the foregoing and other objects in view, there is provided, in accordance with the invention a device for transferring crosswound coils from a crosswound-coil delivery location of a textile machine into a box-shaped conveyance, comprising a flat conveyor for collecting crosswound coils in mutually adjacent rows, and grippers for unloading the collected crosswound coils, the flat conveyor and the grippers being combined into one structural unit, the structural unit being pivotable in a vertical plane through an angle of substantially 180° and being controllably changeable in position in vertical and horizontal direction.

Because the flat conveyor and the grippers are combined into a single unit, the flat conveyor can initially accommodate the desired number of coils, the grippers can tightly hold the coils, the structural unit can be swung or pivoted in a vertical plane through an angle of substantially 180° and can be driven in horizontal direction until it is above a location of the box-shaped conveyance at which the collected crosswound coils are to be deposited or set down, the structural unit can then be lowered controllingly in vertical direction until the crosswound coils are located directly above the delivery location and make contact with the bottom of the conveyance, respectively, the grippers can then be opened so as to deliver the crosswound coils, and the structural unit can be restored to its starting position.

In accordance with another feature of the invention the flat conveyor is formed of a drivable conveyor belt. In accordance with a further feature of the invention, the conveyor belt is drivable stepwise.

In accordance with an alternate feature of the invention, the flat conveyor is formed of a roller conveyor.

The crosswound coils to be collected can, for example, be shoved together on the roller conveyor and a stepwise-drivable conveyor belt can travel farther a distance equal to the length of a coil, respectively, in order to accommodate an additional crosswound coil. Thus, in accordance with an added feature of the invention, there is provided a sensor for determining the presence of the crosswound coils on the flat conveyor, at least one of the conveyor belt and the grippers being controllable by the sensor.

In accordance with an additional feature of the invention, there is provided a crosswound-coil counting device for controlling the grippers.

In accordance with yet another feature of the invention the structural unit has a pivoting device with two planetary gearings, each of which is formed of a stationary sun gear, a planetary wheel and a strap, both of the planetary wheels being firmly connected to the structural unit, and including an adjusting device for pivoting the strap through an angle of substantially 90°. In this regard if the transmission or gear ratio between the sun gear and the planetary wheel is chosen at 1 to 1, the strap is pivoted through an angle of substantially 90° and the planetary wheel is rotated through an angle of substantially 180°. This means that crosswound coils previously located above on the structural unit are located below after the planetary wheels have been rotated through an angle of 180° and, in this location, can later be placed effortlessly and carefully into the box-shaped conveyance.

In accordance with yet a further feature of the invention, there is provided a reciprocatingly movable lifting carriage to which the sun gear is connected. Such a lifting carriage can have slide guides or also roller guides and, in a relatively simple manner, can ensure the lowering of the structural unit for the purpose of delivering or laying the coils into the conveyance.

In accordance with yet another feature of the invention, there is provided a driving device for the lifting carriage, the driving device having at least one retaining belt windable on a drum for retaining the lifting carriage. If the lifting carriage is somewhat wider, two parallel retaining belts can be employed to advantage.

Because the structural unit of grippers and a flat conveyor is also controllingly changeable locally or displaceable, in horizontal direction, in accordance with yet a further feature of the invention, there are provided guide rails and another carriage displaceable horizontally on and along the guide rails, the driving device for the lifting carriage and means for guiding and retaining the lifting carriage in its reciprocal movement being connected to the other carriage.

In accordance with yet an added feature of the invention, the adjusting device for the pivoting device is controllable by at least one of crosswound-coil counting device and the sensor which determines the presence of the crosswound coils on the flat conveyor.

In accordance with yet an additional feature of the invention, there is provided a sensor for monitoring tension of one of the retaining belts retaining the lifting carriage, the driving device of the lifting carriage being controllable by the tension-monitoring sensor. If the lifting carriage travels downwardly, for example, in order to deliver crosswound coils disposed in the structural unit, the retaining belt becomes free of tension when the crosswound coils come into contact with the bottom of the conveyance, a fact which is determined by the sensor, which can then initially stop the driving device of the lifting carriage and can, thereafter, switch over to return travel.

In accordance with another feature of the invention, there is provided a driving device for the horizontally displaceable other carriage, the driving device including a programmable stepping device. The crosswound coils can thereby be deposited in rows into the box-shaped conveyance. The length of the steps is determined essentially in accordance with the diameter of the crosswound coils.

Basically, a distinction must be made between cylindrically and conically shaped crosswound coils. Whereas cylindrically constructed crosswound coils are able to be introduced without any problem into a box-shaped conveyance or transport container, this is not the case for conical crosswound coils, especially if the conicity thereof is very pronounced. When laying down or delivering conical crosswound coils, it is advisable to vary the direction of the conicity of the respective coils from row to row and/or from layer to layer of the coils. In order to permit this, in accordance with a further feature of the invention, the pivoting device of the structural unit formed of the flat conveyor and the grippers is pivotable about a vertical axis. When conical crosswound coils are delivered, the structural unit can then from time to time be pivoted through an angle of 180° in a horizontal plane.

Pivotability about a vertical axis is advantageous and, in accordance with an added feature of the invention, the lifting carriage has a bracket, and the sun gears of the pivoting device have a support structure which is pivotally mounted on the bracket.

In accordance with a concomitant feature of the invention, there is provided a horizontal pivoting device which is reversible over a pivot angle of 180° and is disposed between the support structure and the lifting carriage. Such a horizontal pivoting device can be formed, for example, of a stepping motor having a shaft which is fastened to the bracket and having a housing which is connected to the support structure.

Other features which are considered as characteristic for the invention are set forth in the appended claims.

Although the invention is illustrated and described herein as embodied in a device for transferring crosswound coils from a crosswound coil delivery location of a textile machine into a box-shaped conveyance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
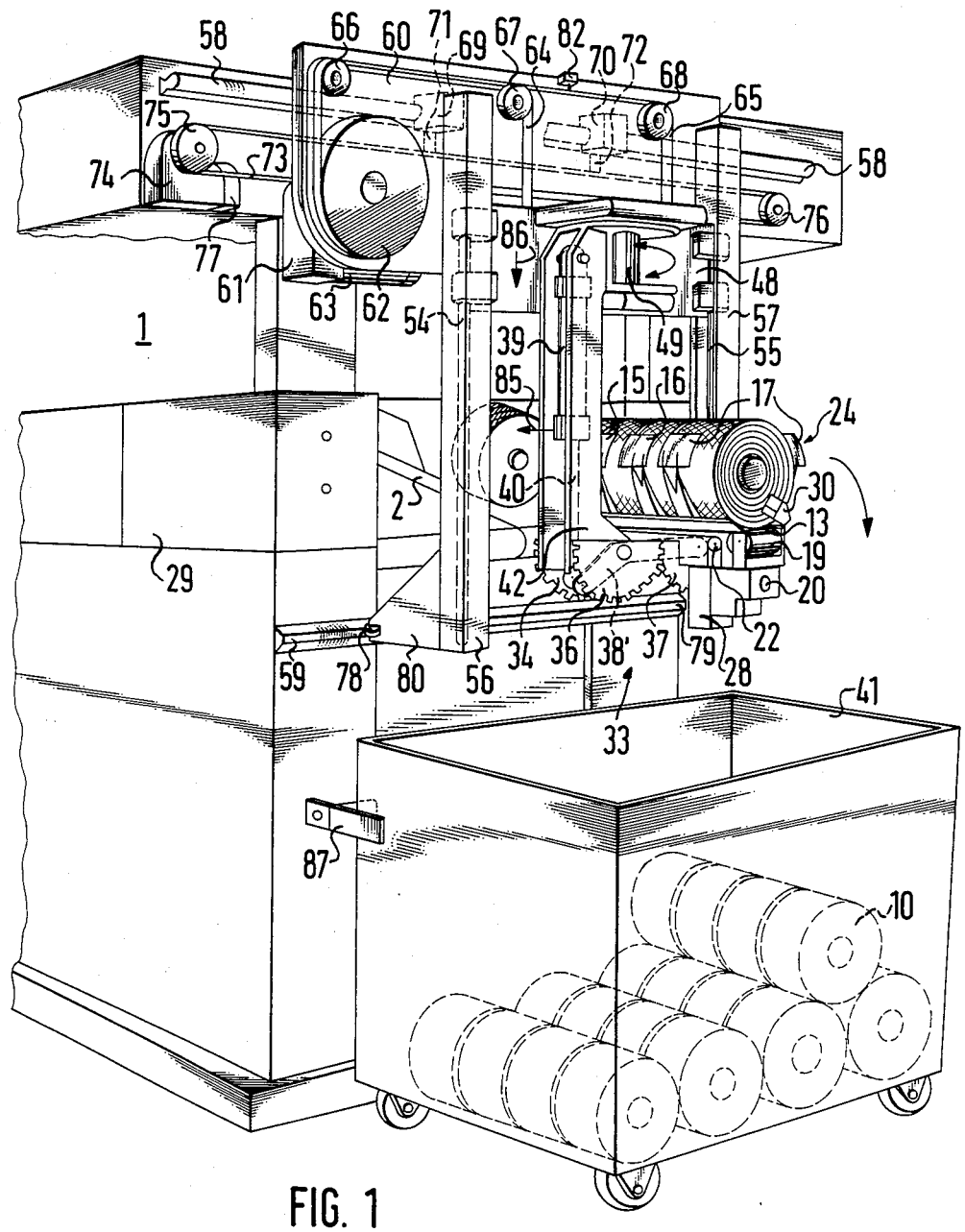
FIG. 1 is a front and side perspective view of a device for transferring crosswound coils from a crosswound-coil delivery location of a textile machine into a box-shaped conveyance in accordance with the invention.
Figure 2:
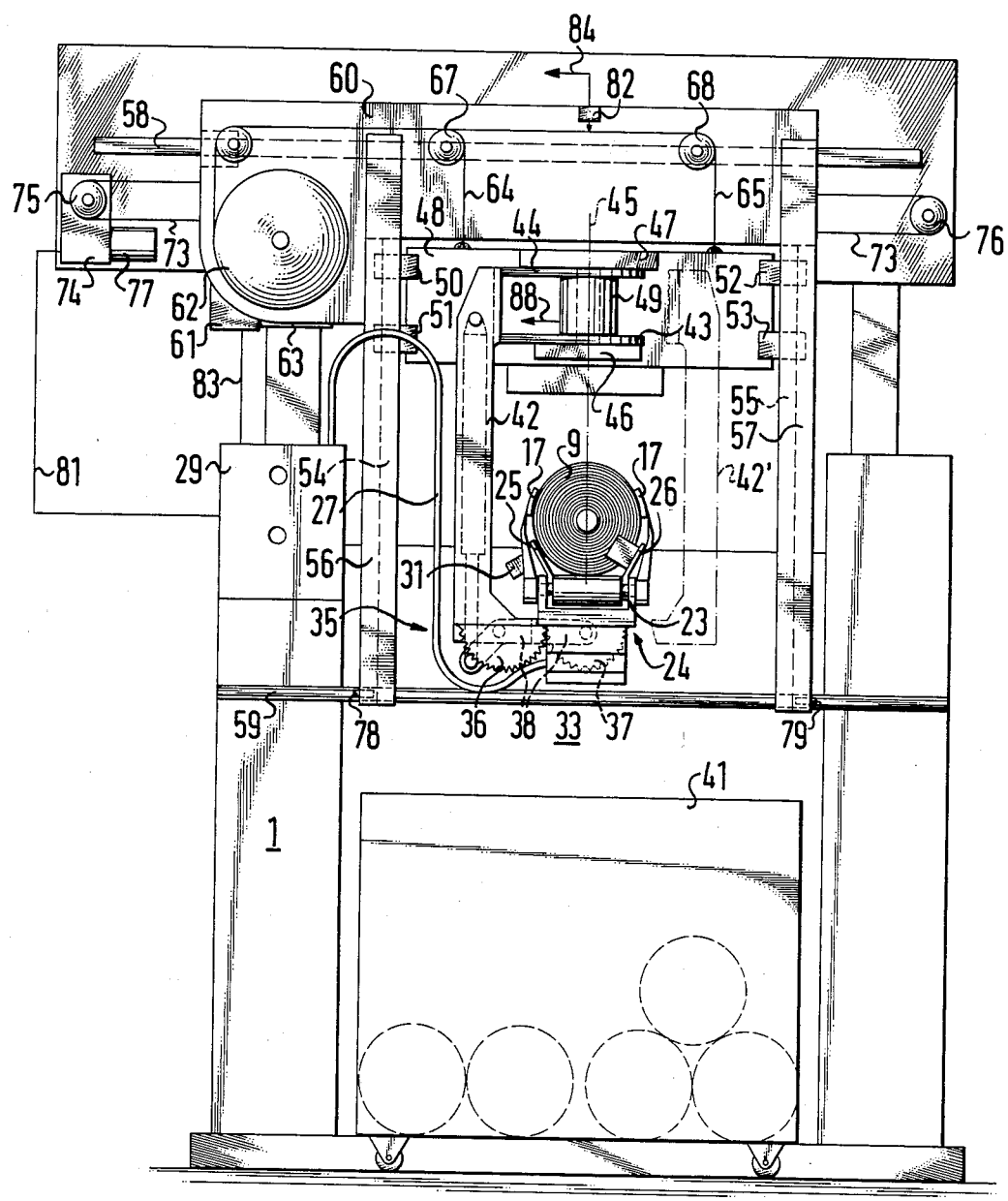
FIG. 2 is a front elevational view of FIG. 1.
Figure 3:
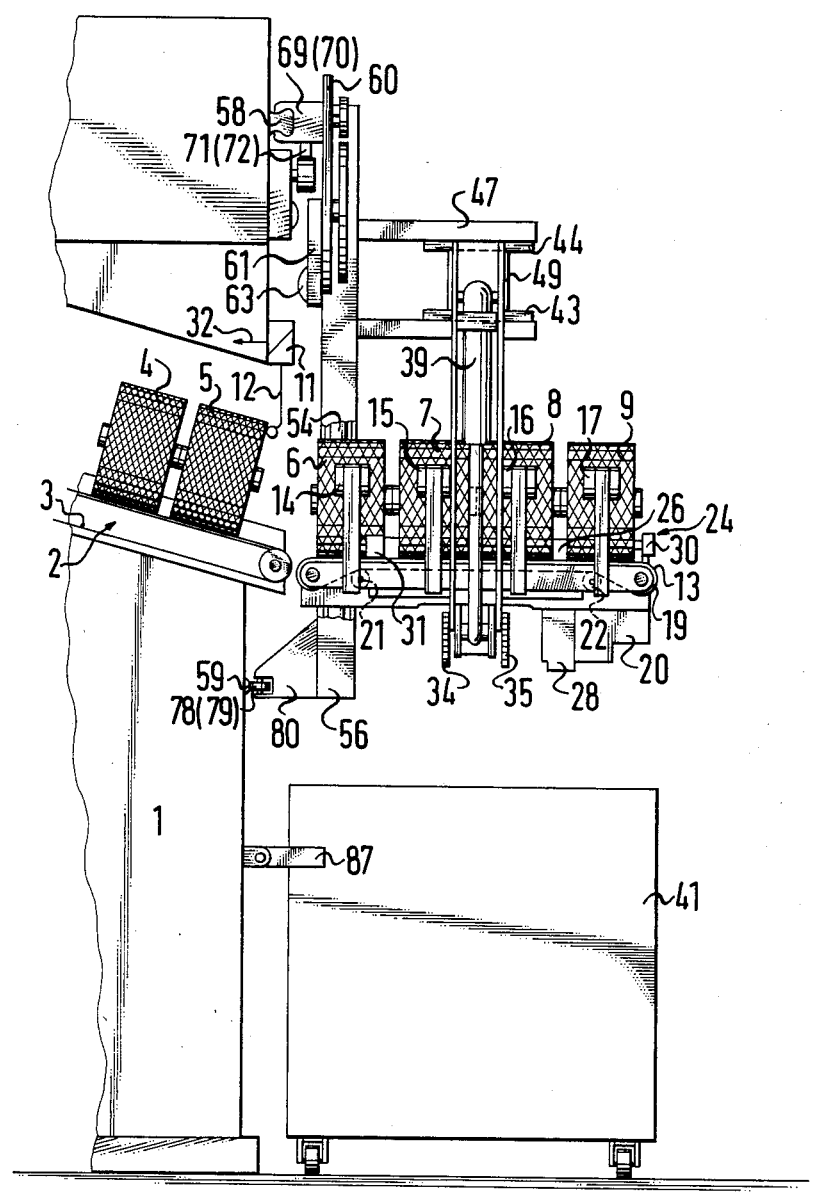
FIG. 3 is a side elevational view of FIG. 2.
Figure 4:
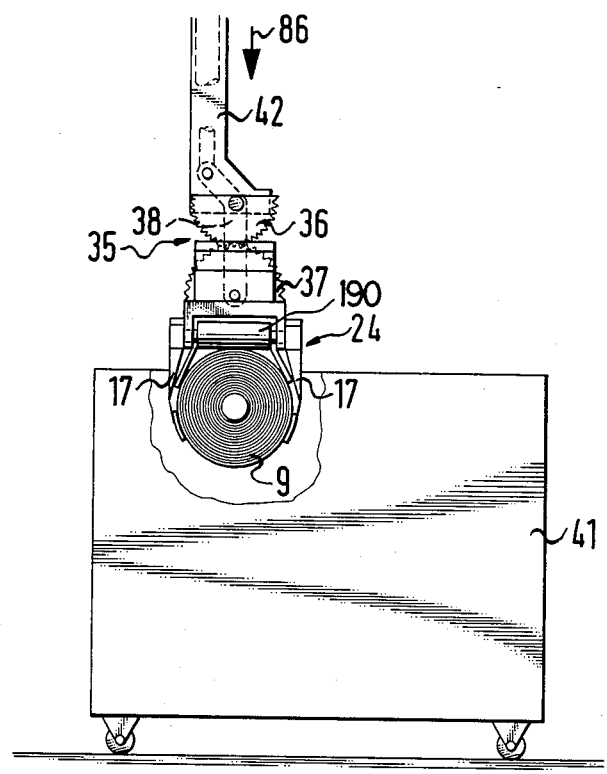
FIG. 4 is a fragmentary view of FIG. 2 wherein another embodiment of the device is shown in a different stage of operation thereof.

Referring now to the drawing and, first, particularly to FIGS. 1, 2 and 3 thereof, there is shown an open-ended spinning machine 1 for producing crosswound coils or cheeses which has a crosswound coil delivery location 2 at a front side thereof. An inclined conveyor belt 3 (FIG. 3) is located at the crosswound-coil delivery location 2 and, at the instant illustrated in FIG. 3, two crosswound coils 4 and 5 have been collected thereon. A coil restraint or blocking member 12 actuatable by an electromagnetic drive 11 prevents the coils 4 and 5 from reaching a structural unit 24 formed of a flat conveyor 13 and pairs of grippers 14 to 17. The flat conveyor 13 is in the form of a conveyor belt which travels over rollers 18 and 19 of which the roller 19 is driven by a driving device 20. In the embodiment of FIG. 4, the flat conveyor 13 is in the form of a roller conveyor of which only one roller 190 is shown in FIG. 4. The conveyor belt 13 is supported from below by supporting rollers 21 and 22. FIG. 2 clearly shows that the gripper pairs 14 to 17 are actuatable by a pneumatic actuating device 23. The gripper pairs 14 to 17 a brought into engagement with the respective crosswound coils 6 to 9 by the actuating device 23 so as to hold the respective crosswound coils 6 to 9. The gripper pairs 14 to 17 are opened by the structural unit farther than shown in FIG. 2 when the crosswound coils are first taken over or in order to release the crosswound coils previously held by the gripper pairs. Protective plates 25 and 26 on both sides of the conveyor belt 13 prevent the crosswound coils from unintentionally falling off the conveyor belt 13. A cable 27 serving as an energy transmission and control line connecting the aforementioned driving device 20 and another driving device 28 to a central control device 29 is shown only in FIG. 2. The other driving device 28 serves to control the pneumatic actuating device 23.

At a front end of the protective plate 26, a sensor 30 is carried which determines the presence of a crosswound coil 9. At a rear end of the protective plate 25, a crosswound-coil counting device 31 is carried. Both the sensor 30 as well as the crosswound-coil counting device 31 are connected via the cable 27 to the central control device 29. A conventional operative connection 32 from the electromagnetic drive 11 to the central control device 29 also is provided. The structural unit 24 formed of the flat conveyor 13 and the grippers 14 to 17 has a pivoting or swinging device identified as a whole by reference numeral 33 by means of which the structural unit 24 is pivotable in a vertical plane through an angle of about 180°. The pivoting device 33 is formed of two planetary transmissions 34 and 35 which are of similar types of construction. The planetary transmission 35 shown, for example, in FIGS. 1, 2 and 3 is constructed in the following manner:

The planetary transmission is formd, respectively, of a stationary sun gear 36, a planetary gear 37 and a strap or bridge 38. Because the planetary gear 37 is supposed to revolve only through an angle of 90° around the sun gear 36, upper segments are missing from both of the gears 36 and 37. The planetary gears 37 are firmly connected to the structural unit 24. The straps 38 are pivotable by a thrusting or lifting device 39 through an angle of about 90°. The thrusting device 39 is formed of a pneumatic cylinder having a piston rod 40 which is articulatingly connected to ends 38' of the strap 38 which extends angularly to a main portion of the strap 38.

If the strap 38, for example, is swung or pivoted out of the position thereof shown in FIG. 2 and through an angle of 90° into a position thereof shown in FIG. 4, the planetary gear 37 which has the same radius as that of the sun gear 36, pivots around the sun gear 36 through an angle of 45°, accordingly turns automatically through an angle of 180° about its own axis and brings the structural unit 24 into the suspended position thereof shown in FIG. 4. The crosswound coils tightly held by the gripper pairs can be introduced, in this position, into a box-shaped conveyance 41.

The two sun gears 36 are carried by a support structure formed of a profiled beam 42 and a pair of substantially horizontal plates 43 and 44. This support structure is mounted on two consoles or brackets 46 and 47 of a lifting carriage or slide 48 and is pivotable about a vertical axis 45.

In order to permit the support structure 42, 43, 44 and, accordingly, the entire pivoting or swinging device 33 with the structural unit 24 to turn through an angle of 180° in the horizontal plane, a horizontal pivoting or swinging device 49 reversible over a pivot angle of 180° is disposed between the plates 43 and 44 of the support structure, on the one hand, and both consoles or brackets 46 and 47, on the other hand. The horizontal pivoting device 49 is formed of an electric stepping motor having a shaft connected to the two consoles or brackets 46 and 47, and a housing connected to the plates 43 and 44.

The lifting carriage 48 is pivoted with means for guiding and retaining it in its reciprocal movement. These means are formed of slide bearings 50 to 53 which are connected to the lifting carriage 48 and are seated on vertical guide rods 54, 55. In the figures, the guide rods 54 and 55 are shown covered in part by beams or columns 56 and 57.

The beams 56 and 57 as well as the guide rods 54 and 55 are parts of a carriage or slide 60 which is displaceable horizontally on and along guide rails 58 and 59. The carriage 60 carries a driving device for the lifting carriage 48, the driving device being identified as a whole by reference numeral 61 and being formed of a drum 62 drivable by a geared motor 63.

Two retaining belts 64 and 65 are windable adjacent one another on the drum 62. The lifting carriage 48 is suspended from the retaining belts 64 and 65. Both of the latter run over rollers 66 and 67, respectively, the retaining belt 65 running additionally over a roller 68.

The guide rail 58 is a slide rail on and along which slide members 69 and 70, which are disposed on the rear side of the carriage 60, can slide. The slide member 69 carries an entrainer 71, and the slide member 70 an entrainer 72. Both of the entrainers 71 and 72 are fastened to an upper strand of an endless belt 73. The endless belt 73 forms part of a driving device, identified as a whole by reference numeral 74, which, besides the aforementioned belt 73, also has two belt rollers 75 and 76, of which the belt roller 75 is drivable by a geared motor 77 which is switchable between running the belt 73 towards the left-hand and the right-hand sides, as viewed in FIG. 1, for example. The lower guide rail 59 is constructed as a track for rollers 78 and 79 which are located at the lower ends of the beams or columns 56 and 57 and mounted on consoles or brackets 80 which are connected to the columns 56 and 57.

The driving device 74 of the horizontally displaceable carriage 60 has programmable stepping switchgear which is located as a subassembly in the central control device 29. An operative connection 81 exists between the programmable stepping switchgear and the driving device 74.

The driving device 61 of the lifting carriage 48 is controllable by a sensor 82 monitoring the stress or tightness of the retaining belt 65. The central control device 29 contains the switch means required for this purpose. The driving device 61 and the sensor 82 are connected by respective operative connections 83 and 84 to the central control device 29.

The adjusting device 39 of the pivoting device 33 is controllable by the sensor 30 which determines the presence of the crosswound coils 6 to 9 on the flat conveyor 13 and/or by the crosswound-coil counting device 31.

The device of the invention operates in the following manner:

Crosswound coils lying on the conveyor belt 3 of the crosswound-coil delivery location 2 are surrendered individually in sequence, the coil restraint or blocking member 12 being withdrawn by the electromagnetic drive 11, in order to free a crosswound coil, the latter being conveyed farther by the continuously running or restarted conveyor belt 3 to the conveyor belt 13. The instant a crosswound coil, for example the coil 5, has travelled past the coil blocking member 12, the electromagnetic drive 11 brings the coil blocking member 12 again into its starting position so as to restrain or block the next following coil. This rhythmic release is controlled by the crosswound-coil counting device 31 which, in cooperation with the sensor 30, can be formed of a relatively simple light or photoelectric barrier, which determines that a crosswound coil has travelled past and, in the instant in which a crosswound coil has travelled past the crosswound-coil counting device 31, transmits a release command via the central control device 29 to the electromagnetic drive 11 which then releases a crosswound coil again.

The conveyor belt 13 can be driven, in two different ways. It either runs continuously and transports the first received crosswound coil, for example the crosswound coil 9, right up to the sensor 30 which then responds; or it is drivable stepwise by a driving device 20. In this case, the crosswound counting device 31 assumes the control of the driving device 20 in that it causes the conveyor belt 13 to stop the instant a crosswound coil travels past the crosswound-coil counting device 31. In this case, the sensor 30 would first respond when the conveyor belt 13 is loaded with four crosswound coils 6 to 9 as in FIG. 3. The conveyor belt 13 cannot then be stepped up, because the last crosswound coil 6 can no longer travel past the crosswound-coil counting device 31. Because both the crosswound-coil counting device 31 and the sensor 30 are responsive the instant four crosswound coils lie on the conveyor belt 13, a summation signal can be formed from the signals of the sensor 30 and the crosswound-coil counting device 31 in the central control device 29, and enables actuation of the swinging or pivoting device 33. The adjusting device 39 then receives an adjusting pulse over an operative connection 85 (FIG. 1) via the central control device 29, the adjusting pulse enabling the piston rod to be drawn back. The planetary gearing 34 and 35 are thereby actuated so that the structural unit 24 comes out of the position thereof shown in FIG. 1 and assumes the position thereof shown in FIG. 4. Beforehand, due to the same summation signal, the grippers 14 to 17 were closed, the central control device 29 having enabled the driving device 28 via the cable 27 to actuate the pneumatic actuating device 23 and, accordingly, to close the gripper pairs 14 to 17.

Thereafter, the driving device 74 is enabled to shift the carriage 60 horizontally in accordance with a given program in order to attain the correct position of the structural unit 24 above the location at which the four crosswound coils are to be laid into the box-shaped conveyance 41. When this has occurred, the driving device 61 of the lifting carriage 48 is automatically activated via the operative connection 83. The instant the drum 62 rotates, both retaining belts 64 and 65 unwind therefrom, and the lifting carriage 48 slides on and along the guide rods 54 and 55 downwardly in direction of the arrow 86. This situation is shown, for example, in FIG. 4.

Starting from the position shown in FIG. 4, the drum 62 continues to run until the crosswound coils 6 to 9 tightly held by the grippers either make contact with the bottom of the conveyance or transport container 41 or with crosswound coils previously deposited therein. Via the operative connection 84, the sensor 82 causes the drum 62 to stop and the gripper pairs 14 to 17 to open. The grippers resiliently or flexibly engaging the crosswound coils then release the crosswound coils. After a brief pause, the geared motor 63 is switched over to reverse operation, and the lifting carriage 48 is again driven back into the starting position thereof as shown in FIG. 2.

Further actuations of the device can be preprogrammed in the central control device 29. When the gripper pairs 14 to 17 are opened, the structural unit 24 is again brought back into the starting position thereof shown in FIG. 2, and loading of the flat conveyor 13 with crosswound coils begins anew. The instant the conveyance or transport container 41 is filled with crosswound coils an angular stop 87 is manually turned or flipped upwardly, and the conveyance 41 is driven away. The stop 87 is again turned downwardly and then serves for orienting the position of a new conveyance or transport container.

When cylindrical crosswound coils are conveyed, the horizontal swinging or pivoting device 49 remains inoperative. If the open-ended spinning machine 1 winds conical crosswound coils instead of cylindrical coils, the conical coils arrive at the crosswound-coil delivery location 2 either with the narrow or the wide end of the cone arranged in forward position. Before each swing of the structural unit in a vertical plane, the horizontal swinging or pivoting device 49 is first set into operation, so as to cause the support structure 42 to 44 to execute a swinging or pivoting movement through an angle of 180° about the vertical axis 45. For this purpose, the horizontal swinging or pivoting device 49 has an operative connection 88 (FIG. 2) with the central control device 29. During the swing through an angle of 180°, for example, the support structure 42 to 44 is shifted out of the position thereof shown in FIG. 2 and into the position 42′ thereof which in phantom.

The foregoing is a description corresponding in substance to German Application P No. 34 41 778.8, dated Nov. 15, 1984, the International priority of which is being claimed for the instant application, and which is hereby made part of this application. Any material discrepancies between the foregoing specification and the aforementioned corresponding German application are to be resolved in favor of the latter.

I claim:

1. Device for transferring crosswound coils from a crosswound-coil delivery location of a textile machine into a box-shaped conveyance, comprising a flat conveyor having means for defining a substantially flat supporting surface whereon crosswound coils are collectible in mutually adjacent rows, and grippers for unloading a plurality of said crosswound coils collected on said substantially flat supporting surface, said flat conveyor and said grippers being combined into one structural unit, said structural unit being pivotable in a vertical plane through an angle of substantially 180° and being controllably changeable in position in vertical and horizontal direction, and means comprising planetary gearing for pivoting said one structural unit in said vertical plane through said angle of substantially 180° so as to shift said one structural unit into a position wherein the crosswound coils are located under said flat conveyor, said grippers being pivotable away laterally so that the crosswound coils are releasable downwardly from the location thereof resulting from the pivoting of said one structural unit through said angle of substantially 180°.

2. Device according to claim 1 wherein said flat conveyor is formed of a drivable conveyor belt.

3. Device according to claim 2 wherein said conveyor belt is drivable stepwise.

4. Device according to claim 1 wherein said flat conveyor is formed of a roller conveyor.

5. Device according to claim 2 including a sensor for determinating the presence of the crosswound coils on said flat conveyor, at least one of said conveyor belt and said grippers being controllable by said sensor.

6. Device according to claim 1 including a crosswound-coil counting device for controlling said grippers.

7. Device for transferring crosswound coils from a crosswound-coil delivery location of a textile machine into a box-shaped conveyance, comprising a flat conveyor having means for defining a substantially flat supporting surface whereon crosswound coils are collectible in mutually adjacent rows, and grippers for unloading a plurality of said crosswound coils collected on said substantially flat supporting surface, said flat conveyor and said grippers being combined into one structural unit, said structural unit being pivotable in a vertical plane through an angle of substantially 180° and being controllably changeable in position in vertical and horizontal direction, said structural unit having a pivoting device with two planetary gearings, each of which is formed of a stationary sun gear, a planetary wheel and a strap, both of the planetary wheels being firmly connected to said structural unit, and including an adjusting device for pivoting said strap through an angle of substantially 90°.

8. Device according to claim 7 including a reciprocatingly movable lifting carriage to which said sun gear is connected.

9. Device according to claim 8 including a driving device for said lifting carriage, said driving device having at least one retaining belt windable on a drum for retaining said lifting carriage.

10. Device according to claim 9 including guide rails and another carriage displaceable horizontally on and along said guide rails, said driving device for said lifting carriage and means for guiding and retaining said lifting carriage in its reciprocal movement being connected to said other carriage.

11. Device according to claim 6 wherein said adjusting device for said pivoting device is controllable by said crosswound-coil counting device.

12. Device for transferring crosswound coils from a crosswound-coil delivery location of a textile machine into a box-shaped conveyance, comprising a flat conveyor for collecting crossword coils in mutually adjacent rows, and grippers for unloading the collected crosswound coils, said flat conveyor and said grippers being combined into one structural unit, said structural unit being pivotable in a vertical plane through an angle of substantially 180° and being controllably changeable in position in vertical and horizontal direction, said structural unit has a pivoting device with two planetary gearings, each of which is formed of a stationary sun gear, a planetary wheel and a strap, both of the planetary wheels being firmly connected to said structural unit, an adjusting device for pivoting said strap through an angle of substantially 90°, a reciprocatingly movable lifting carriage to which said sun gear is connected, a driving device for said lifting carriage, said driving device having at least one retaining belt windable on a drum for retaining said lifting carriage and a sensor for monitoring tension of one of said retaining belts retaining said lifting carriage, said driving device of said lifting carriage being controllable by said tension-monitoring sensor.

13. Device aaccording to claim 10 including a driving device for said horizontally displaceable other carriage, said driving device including a programmable stepping device.

14. Device according to claim 7 wherein said pivoting device of said structural unit formed of said flat conveyor and said grippers is pivotable about a vertical axis.

15. Device according to claim 8 wherein said lifting carriage has a bracket, and said sun gears of said pivoting device have a support structure which is pivotally mounted on said bracket.

16. Device according to claim 15 including a horizontal pivoting device which is reversible over a pivot angle of 180° and is disposed between said support structure and said lifting carriage.

17. Device according to claim 5 wherein said adjusting device for said pivoting device is controllable by said sensor which determines the presence of the crosswound coils on said flat conveyor.

* * * * *